(12) United States Patent
Lee et al.

(10) Patent No.: US 7,646,873 B2
(45) Date of Patent: Jan. 12, 2010

(54) KEY MANAGER FOR QKD NETWORKS

(75) Inventors: Keun M. Lee, Newburyport, MA (US); Andrlus Berzanskis, Cambridge, MA (US)

(73) Assignee: Magiq Technologies, Inc., New York, NY (US)

( * ) Notice: Subject to any disclaimer, the term of this patent is extended or adjusted under 35 U.S.C. 154(b) by 637 days.

(21) Appl. No.: 11/167,740

(22) Filed: Jun. 27, 2005

(65) Prior Publication Data

US 2006/0062392 A1 Mar. 23, 2006

Related U.S. Application Data

(60) Provisional application No. 60/586,448, filed on Jul. 8, 2004.

(51) Int. Cl.
*H04L 1/00* (2006.01)
*H04L 9/08* (2006.01)
*H04L 9/32* (2006.01)

(52) U.S. Cl. ............... 380/277; 380/278; 380/279; 713/168; 713/169; 713/170; 713/176

(58) Field of Classification Search .......... 380/277, 380/278, 279
See application file for complete search history.

(56) References Cited

U.S. PATENT DOCUMENTS

| | | | |
|---|---|---|---|
| 4,897,875 A | | 1/1990 | Pollard et al. |
| 6,510,519 B2 * | | 1/2003 | Wasilewski et al. ......... 713/168 |
| 2004/0005061 A1 | | 1/2004 | Buer et al. |
| 2004/0120528 A1 * | | 6/2004 | Elliott et al. ................. 380/278 |
| 2005/0047598 A1 * | | 3/2005 | Kruegel ....................... 380/264 |
| 2005/0063547 A1 * | | 3/2005 | Berzanskis et al. .......... 380/278 |
| 2006/0059347 A1 * | | 3/2006 | Herz et al. ................... 713/176 |
| 2008/0013733 A1 * | | 1/2008 | Johansson et al. ........... 380/278 |

FOREIGN PATENT DOCUMENTS

| WO | WO 95/07582 | 3/1995 |
|---|---|---|
| WO | WO 01/95554 A1 | 12/2001 |
| WO | WO 02/5480 A1 | 1/2002 |

OTHER PUBLICATIONS

Elliott, "Quantum Cryptography in Practice," May 2003, Pre-Printed by Bent Solutions, LLC.

* cited by examiner

*Primary Examiner*—Ayaz R Sheikh
*Assistant Examiner*—Shin-Hon Chen
(74) *Attorney, Agent, or Firm*—Opticus IP Law PLLC

(57) ABSTRACT

Key manager systems and methods for a QKD-based network are disclosed. The system includes a QKD layer that generates quantum encryption keys, a persistent storage layer that stores the quantum encryption keys, and a key management layer. The key management layer generates an application registration record that includes a list of multiple applications that use the quantum encryption keys. The key management layer also generates a corresponding key storage layer. The multiple applications reside in an applications layer. The applications in each node remove keys from the key storage layer so that each node can encrypt/decrypt data using quantum encryption keys. The methods also include secure QKD system boot-up and authentication that facilitate implementing a commercial QKD system in real-world environments.

15 Claims, 1 Drawing Sheet

KEY MANAGER FOR QKD NETWORKS

CLAIM OF PRIORITY

This application claims priority under 35 USC §119(e) from U.S. Provisional Patent Application No. 60/586,448, filed on Jul. 8, 2004, and entitled "Key manager for QKD networks."

FIELD OF THE INVENTION

The present invention relates to quantum cryptography, and in particular relates to managing keys in quantum key distribution (QKD) system networks.

BACKGROUND OF THE INVENTION

Quantum key distribution involves establishing a key between two QKD stations ("boxes")—typically referred to as a sender named "Alice" and a receiver named "Bob"—by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in the publication by C. H. Bennett et al., entitled "Experimental Quantum Cryptography" J. Cryptology, (1992) 5: 3-28, and in the publication by C. H. Bennett, entitled "Quantum Cryptography Using Any Two Non-Orthogonal States", Phys. Rev. Lett. 68 3121 (1992). The general process for performing QKD is described in the book by Bouwmeester et al., entitled "The Physics of Quantum Information," Springer-Verlag 2001, in Section 2.3, pages 27-33.

The above-mentioned publications each describe a so-called "one-way" QKD system wherein Alice randomly encodes the polarization or phase of single photons, and Bob randomly measures the polarization or phase of the photons. The one-way system described in the Bennett 1992 paper and incorporated by reference herein is based on a shared interferometric system. Respective parts of the interferometric system are accessible by Alice and Bob so that each can control the phase of the interferometer.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is generally less susceptible to environmental effects than a one-way system.

It will be desirable to one day have multiple QKD links woven into an overall QKD network that connects its QKD endpoints via a mesh of QKD relays or routers. Example QKD networks are discussed in the publication by C. Elliot et al., entitled "Quantum cryptography in practice," New Journal of Physics 4 (2002), 46.1-46.12, and also in PCT Patent Application Publication No. WO 02/05480, which article and Patent Application Publication are incorporated by reference herein.

In a QKD network, the QKD systems that make up the network need to be able to distribute private quantum encryption keys among the participating stations (nodes) of the network. These private keys are to be used by distributed applications such as IPsec, SSL, L2TP, and applications using private security protocols. This requires that the method of acquiring the keys by the applications be node-independent. For example, if application A in one node acquires key K1, the peer application A in another node must also acquire the same key K1. This needs to be done in real time without using frequent communications among the nodes. In addition, since multiple applications "compete" for the keys, there needs to be a way to control the key flow rate from the QKD layer to the application layer. Furthermore, the set of keys distributed from the QKD layer may become inconsistent among the nodes due to the node reset, hardware/software failures, or errors in user administration.

Accordingly, there is a need for a method and architecture to manage and distribute, in real time, QKD-generated quantum encryption keys to all of the nodes in a QKD-based network.

SUMMARY OF THE INVENTION

The present invention provides a method and architecture for managing and distributing, in real time, QKD-generated quantum encryption keys for any two network nodes connected by a QKD link.

A first aspect of the invention is a method of distributing and managing quantum encryption keys ("keys") generated by a quantum key distribution (QKD) system to multiple applications $A=(A_1, \ldots A_n)$ in each node of a QKD network. The method includes generating identical sets of keys and storing the keys in a persistent key record storage module $S=(S_A, S_B \ldots )$ (one for each node) and constructing key records that contain a key identifier for each key and appending the key records to the key record storage module S so that the key records in S are in chronological order. The method also includes providing a key manager module having an application registration record R that includes a list of the multiple applications A for each node that use the quantum encryption keys, a corresponding application key storage K and corresponding key consumption rates $(r_1, \ldots r_n)$. The method further includes distributing, from the key manager module, key records from S to K in accordance to the key consumption rates, removing via the applications A, keys from K for each node, and then using the removed keys to encrypt/decrypt data sent between two or more nodes.

A second aspect of the invention is a method of deploying QKD stations of a QKD system. The method includes, prior to deployment, pre-loading respective key storage units in the QKD stations with bit patterns and then enclosing each QKD station in a secure, tamper-proof enclosure. The method then includes operating the QKD system for a time period longer than a key storage refreshment cycle to replace the pre-loaded bit patterns with quantum encryption keys. The method concludes with deploying the QKD stations.

These and other aspects of the present invention are discussed in detail below.

Figure 1:
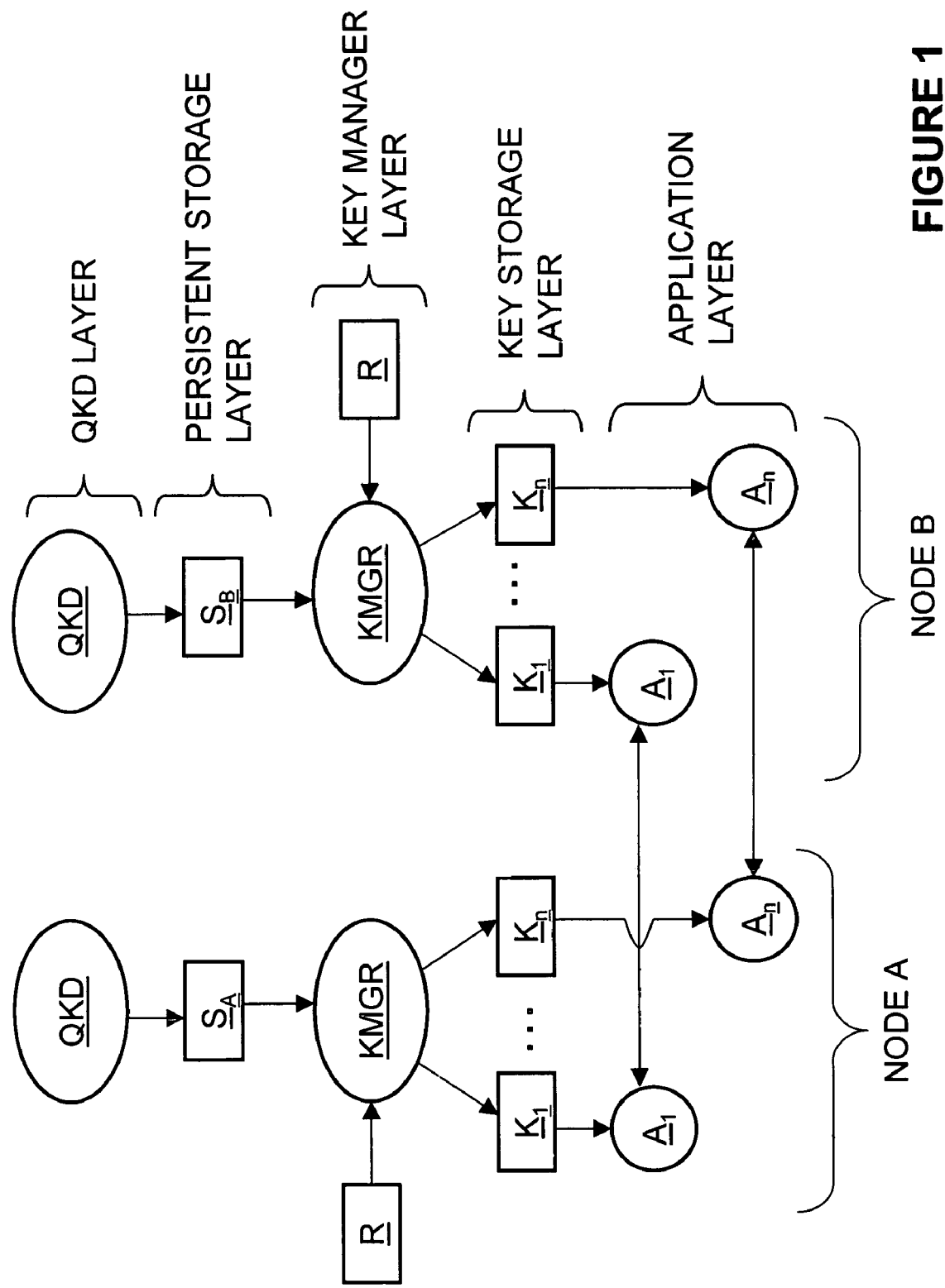
FIG. 1 is a schematic diagram of two nodes of a QKD network that includes the key management system of the presenting invention that allows for quantum encryption keys to be distributed to all of the nodes in the QKD network.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention provides a technique for distributing and managing the encryption keys ("quantum keys") generated by a quantum key distribution (QKD) system with failure recovery support. This is achieved by using a key management system that employs the following methods:

1) Key consuming application registration.
2) Use of globally unique key identifier.
3) Key distribution to application layer function.
4) Audit and recovery.

FIG. 1 is a schematic diagram of two nodes A and B of a QKD network, which includes the key management system of the present invention.

Each node in the network contains the following components:

QKD is the quantum key distribution module. QKD in both nodes generate identical sets of encryption keys and inserts them to a persistent storage S in chronological order. QKD communicates with its peer through the quantum and traditional communication channels. For the sake of example, TCP/IP is assumed for the traditional communication channel in the discussion below.

KMGR is the key manager module that distributes and manages the key records. It consults the application registration record R, determines the key distribution function, takes the key records from S and distributes them to the application key storage modules $K_1, \ldots K_n$. KMGR communicates with its peer through TCP/IP channels. KMGR is conceptually separate from QKD, but can be incorporated in the QKD as a design choice.

$A=(A_1, \ldots A_n)$ are the applications that use the keys from QKD to perform specific services.

$S=(S_A, S_B \ldots)$ and $K=(K_1 \ldots K_n)$ are the persistent storage modules for the encryption key records and the application keys, respectively. Each may be implemented as a database, files, tables, raw device records on disk or non-volatile memory devices. S stores both keys and key records. $S=(S_A, S_B)$ represents the example of a network with two nodes A and B as discussed in the two-node example below.

R is the application registration record.

Thus, the QKD system of FIG. 1 includes the following hierarchical architecture: a QKD layer, a persistent storage layer, a key management layer, a key storage layer, and an applications layer.

System Operation

The QKD system network supports a number of applications. Each application requiring keys has to register with the key manager module KMGR ("the KMGR module"). The registration record R contains a list of the applications $A=(A_1, \ldots A_n)$, the references to corresponding application key storage module $K=(K_1, \ldots K_n)$, and the corresponding key consumption rates $r=(r_1, \ldots r_n)$. It also may contain user-specified policies for each application. For example, it can specify action items the key manager should perform in case it is not able to supply keys to the application at the specified rate. Application registration is the process of adding or removing an application entry to or from registration record R, or changing the content of an application entry in registration record R, and is performed by the user. Both nodes of the QKD link must contain identical registration records.

The QKD modules in nodes A and B generate identical sets of quantum encryption keys of a desired number of bits, and construct a key record that contains a globally unique key identifier and a key. It may also contain additional information, such as a digest of the key, a time stamp, etc. The key identifier is a counter that increases by 1 for every new key record. However, the key identifier may increase by a value greater than 1 to facilitate certain recovery operations. The QKD modules ensure that the key records with the same key identifiers contain identical keys. QKD modules append the key records to the key record storage module S so that the key records in S are in chronological order (that is, increasing order of the key identifier). The latter step can be performed as a database transaction. In such a case, the output of the privacy amplification procedure is appended to S on both the A and B nodes, and is reverted in case it fails at least at one of the nodes. This step requires communication between the nodes.

The key identifier uniquely identifies a key in a given QKD network, but does not reveal any information about the key itself. Therefore, the key identifier may be sent in plain text and the KMGR module can check the consistency of the records on both sides. The KMGR module removes key records from key storage S and distributes them to the appropriate application key storage $K_1, \ldots K_n$ according to the corresponding key consumption rate $r_1, \ldots r_n$. It is required that a given key record be sent to the same application in both nodes. Thus, the KMGR operation includes communicating key identifiers of keys to be inserted to the key storage $K_i$ at nodes A and B. The communication reveals the key identifiers along with key storage $K_i$ numbers 'i'. The key value (or any other information correlating with the value) is never revealed in this communication. Due to the global uniqueness of the key identifier, it is guaranteed that the same key appears at the same key storage K on both nodes A and B.

Once the key records are put in application key storage K, the applications remove the keys from key storage K and use them to encrypt/decrypt the data transmitted over the network. In this method, all applications are symmetric with respect to key acquisition. The QKD application itself can register with the key manager and obtain authentication and encryption keys needed for QKD operation.

Audit and Recovery Functions

The record key storages S and K may be damaged or become inconsistent between the nodes due to a system failure, reset, or user administration error. Accordingly, the KMGR module performs audit and recovery functions during system initialization and reconfiguration. There are two main types of audit/recovery: local and global. The local audit/recovery function verifies that the local data (S, K and R) contain valid records and are consistent with each other. Since this is a local operation, all the records may be examined without compromising the privacy of the keys. In practice, only a few records need to be examined to correct the unfinished transactions and to discover unrecoverable corruptions.

The global audit/recovery function verifies the consistency of the key storage among the peer nodes. The global audit/recovery involves verifying that:

(1) The contents of R are the same;

(2) the key identifiers of the last record in key record storage S are the same; and (3) the key digest of selected key records are the same (these key records are deleted for security).

If discrepancies are found, appropriate recovery actions are taken, such as deleting selected record, or all of the records, from the key storages, or requesting user intervention.

The key consumption rate of the applications may change over time. To accommodate this change, in an example embodiment, the KMGR module employs the dynamic consumption rate option. If enabled, the KMGR module recalculates the key consumption rates for all applications over a period of time and performs the coordinated reconfiguration with its peer using a variation of the two-phase commit protocol. Any node may assume the role of the coordinator. In case of a tie, the node with higher value of the IP address wins.

In an example embodiment, the key record includes a time stamp. A time stamp of the key record allows the management of the keys based on the age of the key. Upon a user's request, or based on a pre-determined policy, any key records older than a certain age are deleted at all nodes using the same two-phase commit protocol. To make this operation independent of the clock differences among the nodes, the coordinator translates the age to the key identifier and requests the participant nodes to delete all key records with key identifier smaller than a particular value.

System Boot-Up and Station Authentication

The system architecture of the present invention allows for a very simple system initialization and authentication protocol. While manufacturing the QKD system, a set of initial key storages $S^0$ are preloaded with a matching set of random keys. When the QKD stations ("boxes") of the QKD system are deployed to their operating positions, the system initializes S with $S^0$ before starting the QKD process. $S^0$ is used only once and is either discarded when QKD is running or refreshed by new random keys generated by QKD.

This solves the QKD box authentication problem because each pair of nodes A and B are preloaded with the same set of random keys. However, these sets of random keys are different for different pairs of boxes in the network. This makes QKD system boot-up essentially the same as the normal QKD operation. This boot-up/authentication capability greatly facilitates implementing commercial QKD system networks in real-world environments.

The very same approach can be used to recover the system from a major failure. In such a case, the key record storages S at both nodes have to be reinitialized with some $S^0$, and the key storages K need to be cleared.

In the system boot-up and authentication method described above, the manufacturer takes care of preloading random keys on each QKD system. In some cases, this might not be desirable, as a customer might want to perform this step, say to facilitate system deployment in a manner that suits particular customer needs. In such a case, the manufacturer can preload any given number of boxes with exactly the same random numbers. This allows any node A to authenticate with any node B, so that the customer may deploy the boxes without caring about pair-wise consistency of A and B nodes.

In an example embodiment, the pre-loaded keys are generated by the box manufacturer in a manner such that even the manufacturer does not know the keys of any delivered QKD system in the network. An example of a manufacturing method to accomplish this is as follows:

a) key record storages S are preloaded with some random number or any other bit pattern $S^0$. For example, all the bits are set to 0;
b) the QKD stations (boxes) are made secure, e.g., by providing the stations with tamper-proof enclosures;
c) before deploying the system (i.e., placing the QKD stations in their operating locations within the network), the manufacturer runs QKD long enough in a controlled and secure environment (e.g., one that seeks to ensure no eavesdropping), so that all the keys in the key record storages S are replaced by the quantum encryption keys generated by QKD. The duration of a full refreshment cycle for the key record storages S is a characteristic of the QKD system and is known. This procedure can also be performed by the customer, e.g., when the customer believes it can perform the procedure with greater security.
d) the secure QKD stations are installed (deployed) in their operating locations within the network.

Using this method, even the manufacturer has no way of knowing the initialization keys in the QKD stations because the keys are generated by QKD with the QKD components being protected by tamper-proof enclosures.

The preinstalled keys can be used for the QKD station authentication in system installation. In combination with some standard key generation method (like Diffie-Hellman), it provides a very strong authentication to prevent a "man in the middle" attack on the system or network.

In the foregoing Detailed Description, various features are grouped together in various example embodiments for ease of understanding. The many features and advantages of the present invention are apparent from the detailed specification, and, thus, it is intended to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein.

What is claimed is:

1. A method of distributing and managing quantum encryption keys ("keys") generated by a quantum key distribution (QKD) system to multiple applications $A=(A_1, \ldots A_n)$ in each node of a QKD network, the method comprising:
   generating identical sets of keys and storing the keys in a persistent key record storage modules $S=(S_A, S_B, \ldots)$;
   constructing key records that contain a key identifier for each key and appending the key records to the key record storage module S so that the key records in S are in chronological order;
   providing a key manager module having an application registration record R that includes a list of the multiple applications A for each node that use the quantum encryption keys, corresponding application key storage modules $K=(K_1, \ldots K_n)$, and corresponding key consumption rates $(r_1, \ldots r_n)$;
   distributing, from the key manager module, key records from S to K in accordance to the key consumption rates;
   removing, via the applications A, keys from K for each node; and
   using the removed keys to encrypt/decrypt data sent by the applications A between two or more nodes.

2. The method of claim 1, including employing a key distribution function in the key manager module that identifies an application for a given key identifier and registration record.

3. The method of claim 1, further including:
   prior to deploying at least two QKD stations of a the QKD system in the QKD network,
   pre-loading the key storage modules K in each QKD station with bit patterns at a facility where the QKD stations are manufactured;
   deploying the QKD stations; and
   initially operating the deployed QKD stations using the pre-loaded bit patterns.

4. The method of claim 3, wherein the bit patterns are random bit patterns.

5. The method of claim 1, further comprising prior to deploying the at least two QKD stations:

enclosing each QKD station in a secure, tamper-proof enclosure;

operating the QKD system for a time period longer than a key storage refreshment cycle to replace pre-loaded bit patterns stored in the key storage modules K with quantum encryption keys; and deploying the QKD stations.

6. The method of claim 1, further including performing at least one of a local a global audit/recovery function during system initialization and system reconfiguration.

7. The method of claim 1, wherein the application registration record includes user-specified policies for each application.

8. The method of claim 1, further including providing the key records with a time stamp.

9. A system for distributing and managing quantum encryption keys in a quantum key distribution (QKD)-based network having multiple nodes, comprising:

a QKD layer having at least two QKD stations operatively configured to optically communicate with each other to generate the quantum encryption keys;

a persistent storage layer operably connected to the QKD layer and having at least two persistent storage modules $S=(S_A, S_B, \ldots)$ adapted to receive from the at least two QKD stations multiple sets of the guantum encryption keys and associated key records and store same;

a key management layer operably connected to the persistent storage layer and having at least two key manager modules each operably connected to an application registration record that includes a list of multiple applications for each node that employs the quantum encryption keys;

a key storage layer operably connected to the key management layer and having at least two persistent key storage modules $K=(K_1, \ldots K_n)$ adapted to receive sets of guantum encryption keys from the at least two persistent storage modules via the key management layer; and an applications layer operably connected to the key storage layer and having at least two applications adapted to take guantum encryption keys from the at least two key storage modules so that each application in each node uses the same quantum encryption keys when encrypting/decrypting data transmitted over the QKD-based network.

10. The system of claim 9, wherein the at least two key manager modules are adapted to recalculate quantum encryption key consumption rates for applications in the applications layer over a period of time and perform a coordinated reconfiguration of the key consumption rates between the at least two key manager modules.

11. The system of claim 9, wherein the at least two key manager modules of the key manager layer are adapted to perform audit and recovery functions during system initialization and reconfiguration.

12. The system of claim 9, wherein the persistent storage modules S and K are implemented in one of: a database, files, tables, raw device records on a disk, and a non-volatile memory device.

13. The system of claim 9, wherein the at least two QKD stations each initially include pre-loaded bit patterns.

14. The system of claim 13, wherein the pre-loaded bit patterns comprise quantum keys.

15. The system of claim 9, wherein the at least two QKD stations are each enclosed in a secure, tamper-proof enclosure.

* * * * *